United States Patent
Kim et al.

(10) Patent No.: US 10,622,648 B2
(45) Date of Patent: Apr. 14, 2020

(54) CONSTANT VOLTAGE CONTROL METHOD AND SYSTEM OF FUEL CELL VEHICLE

(71) Applicant: Hyundai Motor Company, Seoul (KR)

(72) Inventors: Dae Jong Kim, Gyeonggi-do (KR); Ki Chang Kim, Seoul (KR); Jung Jae Lee, Gyeonggi-do (KR); Sang Chul Yeom, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 592 days.

(21) Appl. No.: 15/297,899

(22) Filed: Oct. 19, 2016

(65) Prior Publication Data

US 2017/0331125 A1 Nov. 16, 2017

(30) Foreign Application Priority Data

May 12, 2016 (KR) .................. 10-2016-0058348

(51) Int. Cl.
| | |
|---|---|
| H01M 8/04223 | (2016.01) |
| H01M 8/04746 | (2016.01) |
| H01M 8/04302 | (2016.01) |
| H01M 8/0432 | (2016.01) |
| H01M 8/04858 | (2016.01) |
| H01M 8/04537 | (2016.01) |
| B60L 58/31 | (2019.01) |
| H01M 8/04225 | (2016.01) |

(52) U.S. Cl.
CPC ......... *H01M 8/04253* (2013.01); *B60L 58/31* (2019.02); *H01M 8/0432* (2013.01); *H01M 8/0488* (2013.01); *H01M 8/04302* (2016.02); *H01M 8/04589* (2013.01); *H01M 8/04753* (2013.01); *H01M 8/04225* (2016.02); *H01M 2250/20* (2013.01); *Y02T 90/32* (2013.01)

(58) Field of Classification Search
CPC ......... H01M 8/04253; H01M 8/04302; H01M 8/0432; H01M 8/04589; H01M 8/04753; H01M 8/0488; H01M 8/04225; Y02T 90/32; B60L 11/188
USPC ....................................................... 429/429
See application file for complete search history.

(56) References Cited

U.S. PATENT DOCUMENTS 8,053,122 B2 * 11/2011 Limbeck ........... H01M 8/04302
429/429
2012/0171585 A1 7/2012 Mueller et al.
(Continued)

FOREIGN PATENT DOCUMENTS

| JP | 2007-172951 A | 7/2007 |
|---|---|---|
| JP | 2010-033900 A | 2/2010 |
| KR | 2010-0056940 A | 5/2010 |

(Continued)

*Primary Examiner* — Anthony R Jimenez
(74) *Attorney, Agent, or Firm* — Mintz Levin Cohn Ferris Glovsky and Popeo, P.C.; Peter F. Corless

(57) ABSTRACT

A constant voltage control method for a fuel cell vehicle includes: determining whether vehicle state information satisfies a cold start condition when the fuel cell vehicle is started; starting constant voltage control on a fuel cell when the vehicle state information satisfies the cold start condition; comparing an RPM of an air blower for supplying air to the fuel cell with a predetermined stop control condition; and terminating the constant voltage control on the fuel cell when the RPM of the air blower satisfies the predetermined control-stopping condition.

11 Claims, 3 Drawing Sheets

(56) References Cited

U.S. PATENT DOCUMENTS

2017/0008420 A1* 1/2017 Kim .................... B60L 11/1892
2017/0294666 A1* 10/2017 Kim .................. H01M 8/04303

FOREIGN PATENT DOCUMENTS

| KR | 10-2011-0062627 A | 6/2011 |
| KR | 10-2012-0006969 A | 1/2012 |
| KR | 2012-0020498 A | 3/2012 |
| KR | 10-2012-0059691 A | 6/2012 |
| KR | 10-2014-0086698 A | 7/2014 |

* cited by examiner

Graph of voltage, current, and RPM of
air blower during operation at constant voltage Fuel cell stack performance change graph

CONSTANT VOLTAGE CONTROL METHOD AND SYSTEM OF FUEL CELL VEHICLE

CROSS REFERENCE TO RELATED APPLICATION

The present application claims under 35 U.S.C. § 119(a) the benefit of Korean Patent Application No. 10-2016-0058348, filed May 12, 2016, the entire contents of which are incorporated by reference herein.

BACKGROUND

1. Technical Field

The present invention relates to a constant voltage control method and system of a fuel cell vehicle that can prevent flooding, which may occur under constant voltage control when a temperature of a fuel cell stack is increased at the time of a cold start.

2. Description of the Related Art

A fuel cell vehicle equipped with a fuel cell system generates electricity by supplying hydrogen, which is used as fuel for a fuel cell stack, and is driven by an electric motor that is operated by the electricity generated by the fuel cell stack. The fuel cell system is a kind of power generation system that changes the chemical energy of fuel directly into electrical energy, instead of heat, through an electrochemical process in the fuel cell stack.

In the fuel cell system, high-purity hydrogen is supplied to an anode of a fuel cell from a hydrogen tank during operation, and atmospheric air is supplied directly to a cathode of the fuel cell by an air supplier such as an air blower.

The hydrogen supplied to the fuel stack is decomposed into hydrogen ions and electrons by a catalyst at the anode, and the hydrogen ions flow to the cathode through a polymer electrolyte membrane, while oxygen supplied to the cathode is bonded with the electrons reaching the cathode through an external wire, thereby producing water and generating electricity.

Meanwhile, unreacted hydrogen and condensate water produced by water flowing from the cathode are discharged at the anode of the fuel cell, where the non-reacted hydrogen is supplied to the fuel cell stack and the condensate water is kept in a water trap and discharged outside.

However, it is impossible to completely discharge the condensate water, so it may be more difficult to generate voltage when starting a fuel cell vehicle that has been parked at a sub-zero temperature than when starting the vehicle at room temperature due to cooling of the condensate water remaining in the fuel cell. In particular, as the fuel cell is cooled, the condensate water remaining therein is also cooled, and accordingly, fuel gases are blocked by ice and cannot reach the reaction region.

Accordingly, many technologies have been developed to prevent such flooding. For example, a fuel cell system that includes a sub-purge valve, which can quickly unfreeze a purge valve, and a hydrogen recirculation valve, can prevent energy consumption by a low-voltage battery for heating valves and deterioration of reliability of cold starting, and can more quickly and efficiently start an engine.

The description provided above as a related art of the present invention is just for helping understanding the background of the present invention and should not be construed as being included in the related art known by those skilled in the art.

SUMMARY

An object of the present invention is to provide a constant voltage control method and system of a fuel cell vehicle that can prevent flooding in a fuel cell due to reduction in a flow rate of air supplied to an air blower when constant voltage control is performed to increase a temperature of the fuel cell at the time of a cold start.

In order to achieve the object of the present invention, a constant voltage control method for a fuel cell vehicle according to an embodiment of the present invention includes: determining, by a control unit, whether vehicle state information satisfies a cold start condition when the fuel cell vehicle is started; starting, by the control unit, constant voltage control of a fuel cell when the vehicle state information satisfies the cold start condition; comparing, by the control unit, an RPM of an air blower for supplying air to the fuel cell with a predetermined stop control condition; and completing, by the control unit, the constant voltage control of the fuel cell when the RPM of the air blower satisfies the predetermined control-stopping condition.

The cold start condition may occur when an internal fuel cell stack temperature, included in the vehicle state information, is a predetermined reference temperature or less.

The method may further include: after starting the constant voltage control, estimating, by the control unit, a minimum necessary heating value on the basis of the vehicle state information; and continuing the constant voltage control, by the control unit, until a heating value of the fuel cell, accumulated from the time the vehicle is started, exceeds the minimum necessary heating value.

The minimum necessary heating value may be estimated based on the temperature, current, and voltage of the fuel cell when the vehicle is started.

The method may further include: before comparing the RPM of the air blower with the predetermined stop control condition, comparing, by the control unit, the RPM of the air blower with a predetermined control-maintaining condition; and maintaining, by the control unit, the constant voltage control on the fuel cell when the RPM of the air blower satisfies the predetermined control-maintaining condition.

The control-stopping condition may be that the rate of change of the RPM of the air blower is a predetermined reference rate of change or more, and the control-maintaining condition may be that the rate of change of the RPM of the air blower is less than the reference rate of change.

The control-stopping condition may be that the sensed RPM of the air blower is a predetermined reference RPM or less.

A constant voltage control system for a fuel cell vehicle according to another embodiment of the present invention includes: a fuel cell; an air blower supplying air to the fuel cell; and a control unit, determining whether vehicle state information satisfies a cold start condition when the fuel cell vehicle is started, starting constant voltage control on the fuel cell when the vehicle state information satisfies the cold start condition, and terminating the constant voltage control on the fuel cell when the RPM of the air blower satisfies a predetermined stop control condition as the result of comparing the RPM of the air blower with the predetermined stop control condition.

The control unit may compare the RPM of the air blower with a predetermined control-maintaining condition before comparing the RPM of the air blower with a predetermined control-stopping condition, and may maintain constant voltage control on the fuel cell when the RPM of the air blower satisfies the predetermined control-maintaining condition.

The control-stopping condition may be that the rate of change of the RPM of the air blower is a predetermined reference rate of change or more, and the control-maintaining condition may be that the rate of change of the RPM of the air blower is less than the reference rate of change.

A non-transitory computer readable medium containing program instructions executed by a processor includes: program instructions that determine whether vehicle state information satisfies a cold start condition when a fuel cell vehicle is started; program instructions that start constant voltage control on a fuel cell when the vehicle state information satisfies the cold start condition; program instructions that compare an RPM of an air blower for supplying air to the fuel cell with a predetermined control-stopping condition; and program instructions that terminate the constant voltage control on the fuel cell when the RPM of the air blower satisfies the predetermined control-stopping condition.

Unlike the related art, in which constant voltage control is performed regardless of the amount of air supplied from an air blower, the present invention terminates constant voltage control when there is a large possibility of flooding of a fuel cell. Because a small amount of air is supplied from an air blower, it is possible to prevent flooding of the fuel cell, and accordingly, it is possible to improve the durability and efficiency of the fuel cell.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
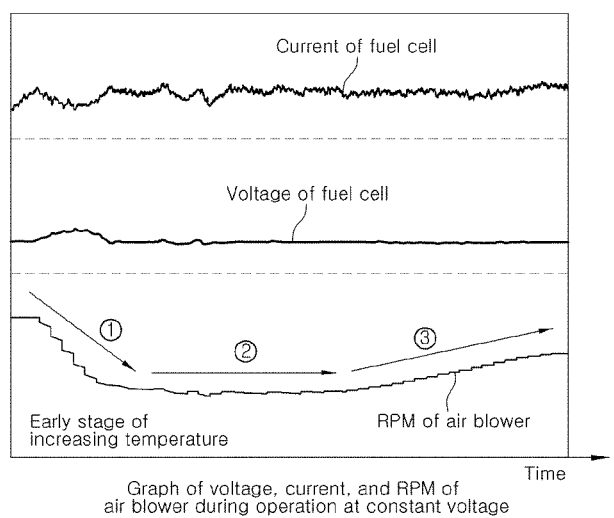
FIG. 1 is a voltage, current, and air blower RPM graph while performing constant voltage control of a fuel cell stack according to an embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present invention will be described in detail with reference to the accompanying drawings.

When an engine is started with a stack of a fuel cell 10 at a lower temperature, it is required to increase the temperature of the stack of the fuel cell 10 in order to output the power that the user desires from the stack of the fuel cell 10. Accordingly, when a vehicle equipped with a fuel cell 10 is started at a low temperature, the vehicle directly enters a normal driving mode, but is started in a low-temperature start mode so as to increase the temperature of the stack of the fuel cell 10. There are many ways to increase the temperature of a stack, one of which is constant voltage control, in which the output voltage of the fuel cell 10 is maintained at a predetermined level.

In general, the fuel cell 10 is operated at a predetermined voltage by controlling the air supply while constant voltage is controlled, so it is difficult to estimate the increase in the temperature of the fuel cell 10. Accordingly, in the related art, constant voltage control is completed when it is determined that a reference level of a heating value, which was previously determined to be appropriate through repeated experimentation, has been exceeded, but the constant voltage control may be completed without a sufficient increase in temperature, and flooding occurs in the stack of the fuel cell 10 due to delayed termination of constant voltage control in some cases.

Accordingly, in order to solve these problems, the present invention proposes a method of determining the point of time at which to terminate constant voltage control using the change in RPM of the air blower 20 over time in constant voltage control. The reason for selecting the RPM of the air blower as the reference for determining whether to terminate constant voltage control in the related art can be seen from the graph in FIG. 1.

The graph in FIG. 1 shows changes in the current and voltage of the fuel cell 10 and the RPM of the air blower 20 during constant voltage control. As can be seen from the graph, there is not a large change in the current and voltage of the fuel cell 10, but the RPM of the air blower 20 rapidly decreases in the early section (section ①) of constant voltage control, is maintained in the middle section (section ②), and increases in the latter section (section ③). Accordingly, it can be seen from the graph in FIG. 1 that it is possible to distinguish between the sections ①, ②, and ③ using the change in the RPM of the air blower 20 during the constant voltage control.

Figure 2:
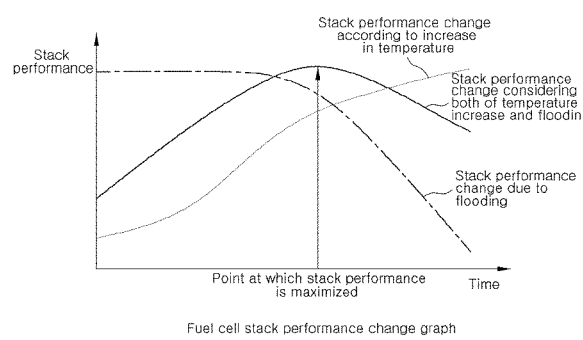
FIG. 2 is a graph showing a change in performance of a fuel cell stack according to an embodiment of the present invention.

The issue is the state of the stack performance of the fuel cell 20 in the sections ①, ②, and ③, which can be seen from the stack performance change graph in FIG. 2. As described above, improvement of performance of the fuel cell 10 according to a temperature increase and a drop in the performance of the fuel cell 10 due to flooding are factors that influence the stack performance of the fuel cell at the time of a cold start. Accordingly, FIG. 2 shows both a stack performance change graph as a function of temperature increase and a stack performance change graph due to flooding, and further shows a stack performance change graph as a function both of a temperature increase and of flooding.

The maximum point of the stack performance is the point at which the stack performance is highest in the stack performance change graph, taking into account both a temperature increase and flooding, and at which the efficiency of constant voltage control of the stack of the fuel cell 10 is maximized. Accordingly, the issue is in which one of the sections ①, ②, and ③ the stack performance is maximized. If stack performance deterioration due to flooding is a problem, control for removing water in the stack by increasing the RPM of the air blower in the fuel cell 10 is generally performed, so it is possible to estimate that the boundary point between the section ② and the section ③ where the RPM of the air blower 20 start increasing is the point where the stack performance is maximized.

Figure 3:
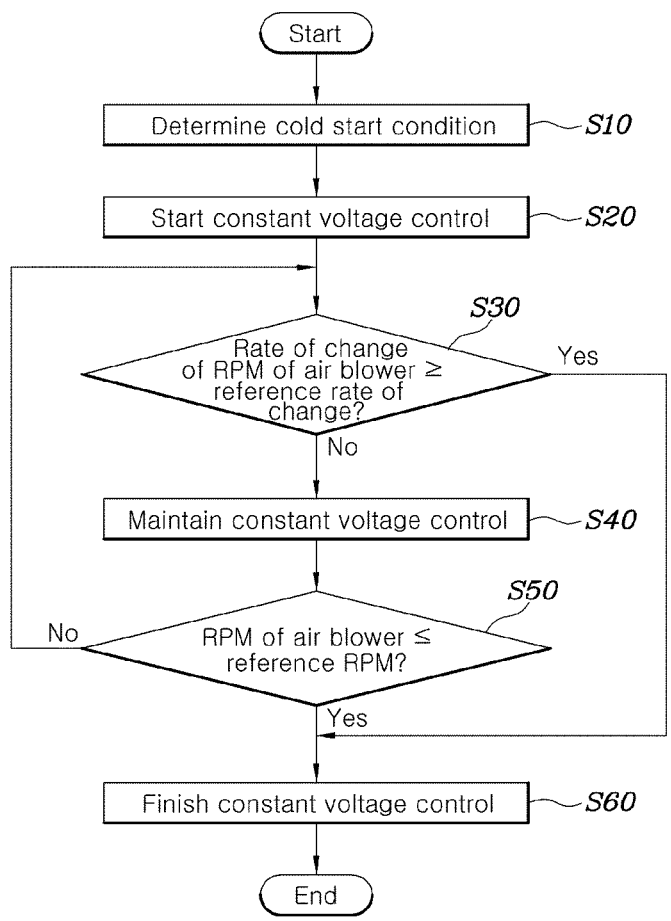
FIG. 3 is a flowchart illustrating a constant voltage control method of a fuel cell vehicle of according to an embodiment of the present invention.

The present invention provides a static voltage control method for a vehicle equipped with a fuel cell 10 that can optimize the stack performance of the fuel cell 10 on the basis of the theory described above, which includes a cold start condition-determining step (S10) that determines whether vehicle state information satisfies a cold start condition by a control unit 30 when the vehicle equipped with the fuel cell 10 is started, as shown in FIG. 3. The constant voltage control according to the present invention corresponds to the case where constant control is required under a cold start condition, so it is determined whether vehicle state information satisfies a cold start condition through the cold start condition-determining step (S10) before constant voltage control is started.

According to the present invention, the cold start condition is the case where the internal stack temperature is a predetermined reference temperature or less, but it is difficult to directly estimate the internal stack temperature, so it may be possible to consider a method of indirectly estimating the internal stack temperature from the temperature of stack cooling water. However, the longer the vehicle is stopped, the larger the difference between the stack cooling water temperature and the internal stack temperature, so it may be possible to estimate the internal stack temperature in consideration of the time for which the vehicle has been stopped. The temperature reference may vary depending on the vehicle performance and the requirements of a designer.

When the vehicle state information satisfies the cold start condition, a constant voltage control starting step (S20) for starting constant voltage control is performed to increase the stack temperature of the fuel cell 10. When the constant voltage control is started, as described above, it is determined whether to keep or stop the constant voltage control on the basis of the RPM of the air blower 20, and in the present invention, the accumulated heating value attributable to the increase in the stack temperature of the fuel cell 10 is supposed to exceed a minimum value before the constant voltage control is stopped on the basis of the RPM of the air blower 20.

This is because the first action to be performed at the time of cold start of the stack of the fuel cell 10 is to increase the stack temperature for the fuel cell 10 to output power. Further, even if folding is accelerated due to the reduction of the RPM of the air blower 20 for increasing the temperature, the flooding is also reduced by the increase in temperature of the fuel cell 10, so it is important to first increase the stack temperature of the fuel cell 10 in the early stage of the cold start.

Accordingly, in the present invention, the minimum necessary heating value is estimated from the vehicle state information by the control unit 30, and the control unit 30 keeps performing constant voltage control until the heating value of the fuel cell 10, accumulated from the time the vehicle is started, exceeds the minimum necessary heating value. The minimum necessary heating value may correspond to the minimum reference of the accumulated heating value, described above, and the accumulated heating value of the stack may be obtained by integrating the product of stack output current and output voltage for a predetermined time. The minimum necessary heating value may vary depending on the stack temperature of the fuel cell 10 and the vehicle performance.

If the accumulated heating value exceeds the minimum necessary heating value, then the temperature for minimum stack output has been reached, and thereafter, constant voltage control is performed on the basis of the RPM of the air blower 20, as described above. In detail, according to the present invention, the control unit 30 determines whether the rate of change of the RPM of the air blower 20 is a reference rate of change or more (S30). This is because, as described above, by comparing FIGS. 1 and 2, the most appropriate point of time at which to terminate the constant voltage control is the boundary point between the section ② and the section ③ in FIG. 1, which corresponds to the case where the RPM of the air blower 20 increases with a predetermined inclination. That is, the rate of change of the RPM of the air blower 20 has a negative value in the section, a value close to zero in the section ②, and a positive value in the section ③, so the case where the rate of change of the RPM of the air blower 20 is a predetermined reference rate of change or more is considered as the reference for terminating the constant voltage control to find out the point of time at which the section ② enters the section ③ using the differences in values. Accordingly, the reference rate of change may vary in accordance with the design of the control method, but it basically has to have a positive value, and the small change of the RPM of the air blower 20 in the section ② may be a value that can be compensated for by a margin.

Accordingly, when the rate of change of RPM of the air blower 20 is the reference rate of change or more, then the section ③ has been started in FIG. 1 during constant voltage control, so it is determined that the point at which the stack performance is maximized is reached, and accordingly, a constant voltage control termination step (S60), at which the constant voltage control is terminated, is performed, as shown in FIG. 1.

In contrast, when the rate of change of RPM of the air blower 20 is less than the reference rate of change, then the RPM of the air blower 20 is in the section ① or the section ② in the graph shown in FIG. 1, so in this case, the constant voltage control may be continued, and accordingly, as shown in FIG. 1, a constant voltage control-maintaining step (S40) is performed. However, even in this case, if the absolute amount of the RPM of the air blower 20, that is, the RPM of the air blower 20, is excessively decreased so as to be equal to or less than a reference RPM, it is possible to determine that this is the point of time at which the stack performance is maximized. Accordingly, even if the rate of change of the RPM of the air blower 20 is less than the reference rate of change, as shown in FIG. 1, the constant voltage control is completed through the constant voltage control termination step (S60).

Therefore, according to the present invention, it is possible to improve stack performance by terminating constant voltage control at the point of time at which the stack performance is maximized on the basis of the RPM of the air blower 20. Further, the temperature of the stack cell of the fuel cell 10 is not uniform due to non-circulation of the stack cooling water at the time of cold start, but in this case, it is possible to prevent deterioration of durability of the stack of the fuel cell 20 by continuing the constant voltage control.

Figure 4:
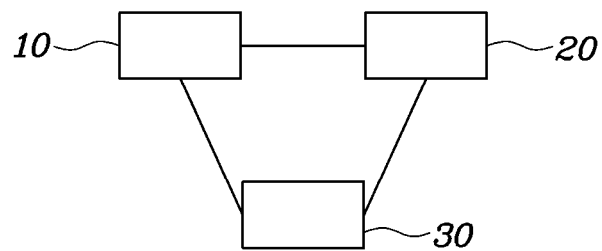
FIG. 4 is a view showing the configuration of a constant voltage control system of a fuel cell vehicle according to an embodiment of the present invention.

Further, the constant voltage control system for a vehicle equipped with the fuel cell 10 according to the present invention, as shown in FIG. 4, may include: the fuel cell 10; the air blower 20, which supplies air to the fuel cell 10; and the control unit 30, which determines whether vehicle state information satisfies a cold start condition when the vehicle equipped with the fuel cell 10 is started, starts constant voltage control of the fuel cell 10 when the vehicle state information satisfies the cold start condition, and terminates the constant voltage control on the fuel cell 10 when the RPM of the air blower 20 satisfies a predetermined control-stopping condition as the result of comparing the RPM of the air blower with the predetermined control-stopping condition.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A constant voltage control method for a fuel cell vehicle, the method comprising:
   determining, by a controller, whether vehicle state information satisfies a cold start condition when the fuel cell vehicle is started;
   starting, by the controller, constant voltage control on a fuel cell when the vehicle state information satisfies the cold start condition;
   comparing, by the controller, an RPM of an air blower for supplying air to the fuel cell with a predetermined control-stopping condition; and
   terminating, by the controller, the constant voltage control on the fuel cell when the RPM of the air blower satisfies the predetermined control-stopping condition.

2. The method of claim 1, wherein the control-stopping condition is that a sensed RPM of the air blower is a predetermined reference RPM or less.

3. The method of claim 1, wherein the cold start condition occurs when an internal fuel cell stack temperature included in the vehicle state information is a predetermined reference temperature or less.

4. The method of claim 1, further comprising: after starting the constant voltage control,
   estimating, by the controller, a minimum necessary heating value on the basis of the vehicle state information; and
   continuing the constant voltage control, by the controller, until a heating value of the fuel cell, accumulated from a time the vehicle is started, exceeds the minimum necessary heating value.

5. The method of claim 4, wherein the minimum necessary heating value is estimated from a temperature, a current, and a voltage of the fuel cell when the vehicle is started.

6. The method of claim 1, further comprising: before comparing the RPM of the air blower with the predetermined control-stopping condition,
   comparing, by the controller, the RPM of the air blower with a predetermined control-maintaining condition; and
   maintaining, by the controller, the constant voltage control on the fuel cell when the RPM of the air blower satisfies the predetermined control-maintaining condition.

7. The method of claim 6, wherein the control-stopping condition is that a rate of change of the RPM of the air blower is a predetermined reference rate of change or more, and the control-maintaining condition is that the rate of change of the RPM of the air blower is less than the reference rate of change.

8. A constant voltage control system for a fuel cell vehicle, comprising:
   a fuel cell;
   an air blower supplying air to the fuel cell; and
   a controller determining whether vehicle state information satisfies a cold start condition when the fuel cell vehicle is started, starting constant voltage control on the fuel cell when the vehicle state information satisfies the cold start condition, and terminating the constant voltage control on the fuel cell when an RPM of the air blower satisfies a predetermined control-stopping condition as a result of comparing an RPM of the air blower with the predetermined control-stopping condition.

9. The system of claim 8, wherein the controller compares the RPM of the air blower with a predetermined control-maintaining condition before comparing the RPM of the air blower with a predetermined control-stopping condition, and maintains constant voltage control on the fuel cell when the RPM of the air blower satisfies the predetermined control-maintaining condition.

10. The system of claim 9, wherein the control-stopping condition is that a rate of change of the RPM of the air blower is a predetermined reference rate of change or more, and the control-maintaining condition is that the rate of change of the RPM of the air blower is less than the reference rate of change.

11. A non-transitory computer readable medium containing program instructions executed by a processor, the computer readable medium comprising:
    program instructions that determine whether vehicle state information satisfies a cold start condition when a fuel cell vehicle is started;

program instructions that start constant voltage control on a fuel cell when the vehicle state information satisfies the cold start condition;
program instructions that compare an RPM of an air blower for supplying air to the fuel cell with a predetermined control-stopping condition; and
program instructions that terminate the constant voltage control on the fuel cell when the RPM of the air blower satisfies the predetermined control-stopping condition.

\* \* \* \* \*